United States Patent Office 2,894,414
Patented July 14, 1959

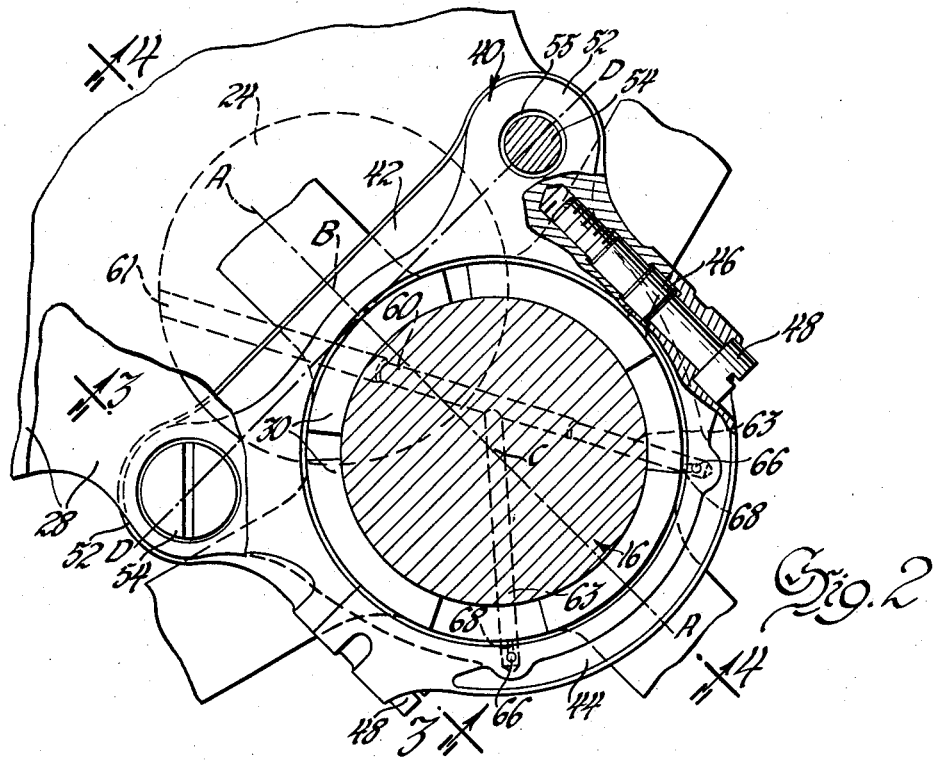
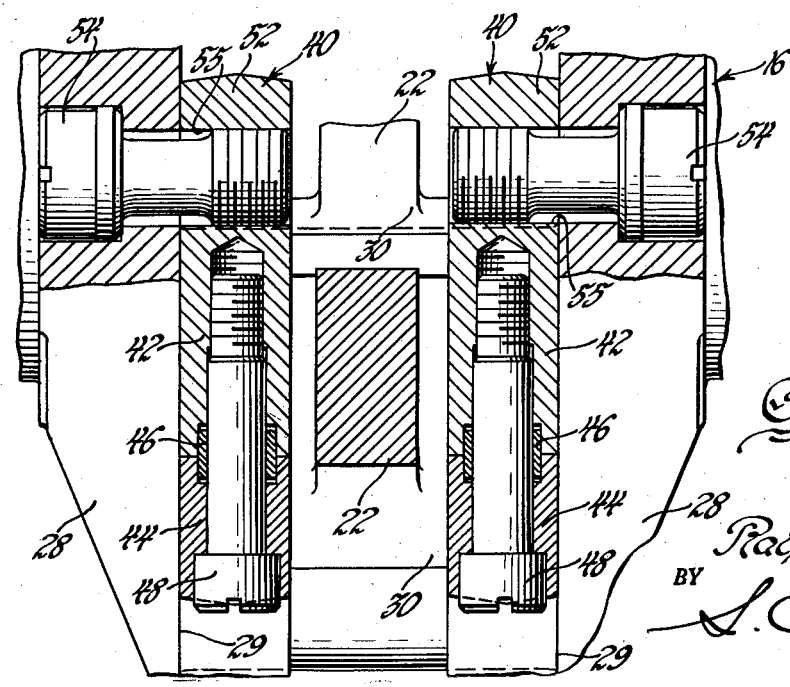

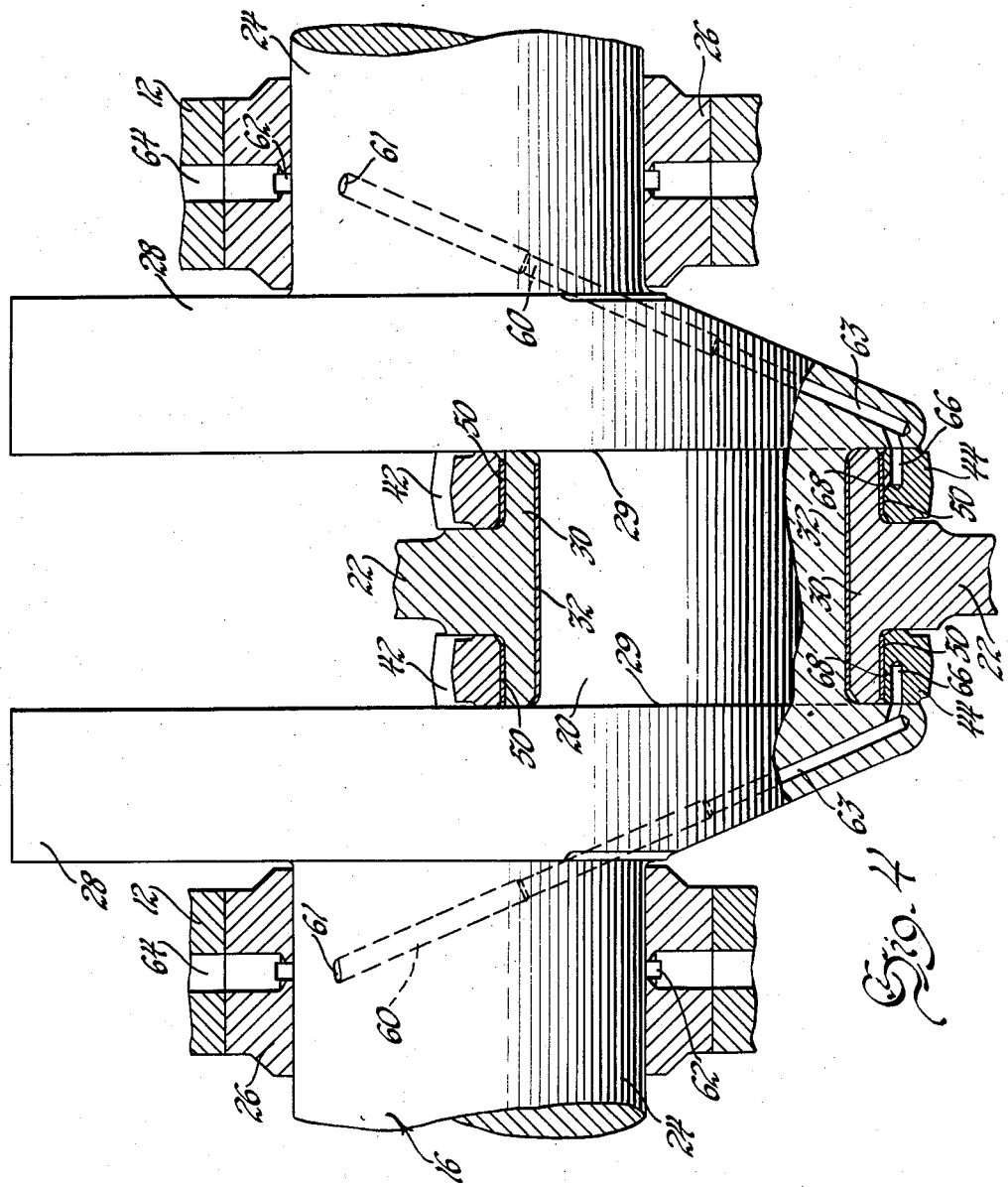

2,894,414
CONNECTING ROD MOUNTING

Ralph S. Johnson, Royal Oak, Mich., assignor to General Motors Corporation, Detroit, Mich., a corporation of Delaware Application May 26, 1955, Serial No. 511,249

11 Claims. (Cl. 74—580)

The present invention relates to connecting rod structures and has particular reference to mounting and lubricating slipper-type connecting rods connecting one or more pistons to a crankpin.

Among the principal objects of the invention is to provide an improved mounting for slipper-type connecting rods having controlled bearing loads permitting the use of a more compact mounting and, hence, a more compact crankcase and engine relative to prior art mountings for such connecting rods.

It is also a principal object of the invention to provide such a connecting rod mounting with an improved lubricating system providing for a simple, efficient, and positive lubrication of the bearing surfaces.

Among the other objects of the invention is to provide a slipper-type connecting rod mounting which is rugged and simple in design, which is relatively inexpensive to manufacture and easily assembled, and which may be utilized with one or more connecting rods.

To achieve these objects, the invention contemplates the use of a slipper-type connecting rod mounting comprising split retaining ring assemblies nonrotatively secured to the crankshaft adjacent the crankshaft's axis of rotation and providing inner bearing surfaces adapted to bear on outer bearing faces of connecting rod slippers to maintain inner bearing faces of the slippers in bearing relation with a crankpin, and lubricant supply means for alternately directing lubricant radially inwardly from the inner surfaces of the retaining ring assemblies onto the outer bearing faces of the slippers and onto the bearing surface of the crankpin.

The foregoing and other objects and features of the invention will be apparent from the following detailed description of a preferred embodiment thereof, reference being made to the accompanying drawings, in which:

Figure 2 is an enlarged fragmentary view of a portion of Figure 1 with portions thereof broken away and in section;

Figure 3 is a sectional view taken substantially on the line 3—3 of Figure 2; and Figure 4 is a sectional view taken substantially on the line 4—4 of Figure 2.

Figure 1:
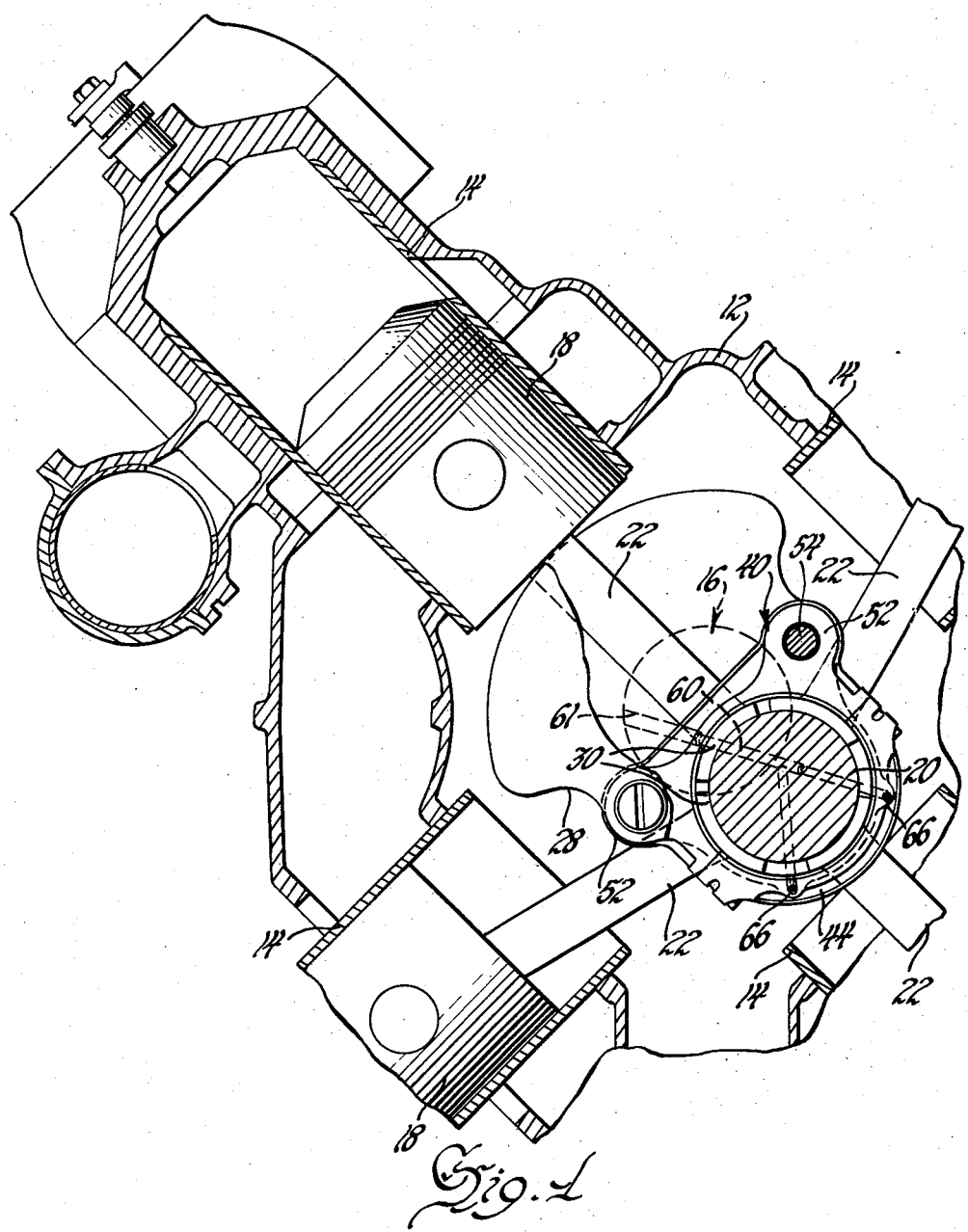
Figure 1 is a transverse sectional view of a cylinder bank of a radial engine embodying the preferred form of the invention.

Referring more particularly to the drawings, the engine shown in Figure 1 has a crankcase 12 mounting a row or bank of cylinders 14 extending radially thereof about the engine crankshaft 16. Each cylinder of the bank is fitted with a piston 18 which is connected to a common crankpin 20 of the crankshaft 16 by connecting rods 22. As best shown in Figure 4, the engine crankshaft 16 includes spaced axially aligned journal portions 24 supported in crankcase-carried journal bearings 26 and connected to adjacent ends of a crankpin 20 by cranks or throws 28. In engines having a plurality of cylinder banks, the crankshaft will necessarily have a crankpin associated wtih each row of cylinders.

Each connecting rod 22 terminates at its inner end with a slipper portion 30 having radially spaced inner and outer arcuate bearing faces which may be lined with suitable antifriction bearing material as indicated at 32 and 50. The inner bearing faces of each slipper 30 are formed to journal the cylindrical periphery of the crankpin and are of sufficient circumferential and axial dimensions to provide for transferring the necessary piston loading pressures. The faces 29 of the cranks 28 connected to opposite ends of the crankpin form laterally supporting shoulders closely embracing and limiting the axial dimension of the several slippers. Consequently, the number of such slippers, and therefore the cylinders per bank, which can be operatively connected to the same crankpin is limited by the bearing pressures which must be imposed thereon, the axial dimension of the crankpin, and the necessity for the slippers to have freedom for relative circumferential movement about the crankpin during each rotating cycle of the crankshaft.

In accordance with the invention, mounting means rotatively fixed with respect to the crankshaft is provided for retaining the slippers in bearing engagement with the crankpin. As shown in the various figures, this means is in the form of two split retaining ring assemblies 40, each of which comprises two segments 42 and 44, the abutting ends of which are dowelled by the sleeves 46 and locked together by suitable means such as bolts 48. The retaining ring segments 42 and 44 are assembled to provide cylindrical inner bearing surfaces embraceably engaging the cylindrical outer bearing faces of the connecting rod slippers 30. After the ring segments have been assembled to embrace the slippers, the segments 42 are each secured to the faces 29 of their adjacent crank portions 28 by bolts 54 which threadably engage tapped bores 55 provided in two radially disposed mounting lugs 52 formed on each of the ring segments 42 symmetrically about a plane indicated by the broken line A—A shown in Figure 2 and passing through the axes of the crankshaft and crankpin, indicated as B and C, respectively. It will be noted that the axes of the bolts 54 lie in a plane, indicated by the broken line D—D, adjacent the rotative axis of the crankshaft and normal to the plane passing through the axes of the crankshaft and crankpin. It will also be noted that the axes of the bolts 48 are parallel to the plane A—A of the crankshaft and crankpin axes and intersect the adjacent ring mounting bolts 54.

As indicated above, suitable antifriction bearing material 50 may be applied to the outer bearing faces of the slippers 30 as desired, and similar material may also be applied to the bearing surfaces of the ring segments 42 and 44 and to the crankpin 20. To insure and maintain concentricity of the inner bearing surface of the assembled retaining rings 40 about the bearing surface of the crankpin 20, it is contemplated that the retaining ring assemblies 40 and crankshaft may be provided with suitable co-locating means, not shown, such as a mating tongue and groove formed in the mating end faces of the crank and ring assembly. However, the concentricity provided by bolt connections 54 will generally be sufficient for most applications.

The lubrication system for the connecting rods 22 and assembled retaining rings 40 is shown in Figures 1, 2, and 4. Two lubricant supply passages 60 extend transversely of the journal and crank portions of the crankshaft from inlets 61 opening on annular grooves 62 formed in each of the journal bearings 26 to branched outlets 63 opening on each of the crank faces 29 adjacent the retaining ring segments 42. The outlet openings on each crank face are symmetrical about the plane A—A of the crankshaft and crankpin axes and are preferably aligned with the openings on the opposite crank face. The grooves 62 are connectable to a source of lubricant pressure through the drilled passages 64 provided in the journal bearings and in the bearing-supporting crankcase webs. Each retaining ring segment 44 is provided with lubricant-directing nozzles or orifices 68 which are connected to the branched outlets 63 of the crankshaft passages 60 by short drilled passages 66 extending axially of the segments 44. The nozzles 68 of the two retaining rings are directed radially and convergingly inwardly from the passages 66 and deliver lubricant sequentially onto the outer bearing faces of each of the connecting rod slippers 30 and onto the bearing surface of the crankpin immediately ahead of the leading edge of each of the slippers substantially at that portion of the rotative cycle of the crankshaft where the slippers are being subjected to the maximum loads of compression and combustion imposed on their respective pistons.

From the foregoing description, the advantages of the instant mounting and lubricating means of the invention will be obvious to those skilled in the art. In conventional mounting structures for this type of connecting rod, the slipper-engaging retaining rings are generally permitted to rotate relative to the crankshaft portions and the connecting rod slippers. This relative rotation of such retaining rings results in a shifting of the dynamic unbalance forces acting on the crankshaft and requires that all portions of the retaining ring be designed to accommodate maximum load factors. Consequently, this relative rotation imposes a design limitation on the compactness of the crankcase and engine generally, since clearance must be provided so that rotating clamping-bolt bosses will not strike the inner ends of the individual cylinder barrels. In the instant construction, as best seen in Figures 1 and 2, the clamping-bolt portions of the retaining ring segments 42 and 44 and the lugs 52 reinforce the retaining ring at those portions of the rotative cycle of the crankshaft when the cocking moment applied to the connecting rod slipper is greatest. As may be seen from Figure 1, these reinforcing portions of the crankshaft carried ring segments remain within the peripheral paths defined by the ring segment 44 and the crank throws. Since the cocking moment applied to each connecting rod slipper decreases as its respective piston approaches top dead center (and also bottom dead center), the peripheral path defining portion of the retaining ring segment 44 presented to the inner ends of the cylinders 18 may also be of a relatively smaller outer diameter. It will thus be seen that the illustrative embodiment of the invention permits the use of a lighter, more compact and more rigid crankcase and cylinder construction.

While the known prior art contains several examples of retaining ring mountings for slipper-type connecting rods which are non-rotatively fixed with respect to the crankshaft, these mountings generally require crankpins of greater radial and axial dimension than the construction of the invention. Further, such prior art mountings make no provision for utilizing the ring clamping and mounting means to impart strength to the ring assembly where required and generally increase the radial dimension presented to the inner portions of the engine cylinders.

The connecting rod connection of the invention is also distinguishable over the known prior art mountings in its provision for an improved lubricating system which provides for efficient positive lubrication of the several bearing surfaces. In conventional slipper-type connections, the lubricating supply passages formed in the crankshaft deliver the lubricant to the bearing surface of the crankpin and inner bearing faces of the several slippers in such a manner that a portion of the supplied lubricant is centrifuged or otherwise lost from the mounting assembly without being used. In accordance with the invention, the lubricant is directed radially and convergingly inwardly toward the bearing surface of the crankpin thereby positively lubricating both the inner and outer bearing faces of the connecting rod slippers and their mating bearing surfaces without excessive loss of the supplied lubricant.

It will be obvious that the symmetry of the outlet openings of the lubricating outlet passages 63 and the symmetry of the portions of the retaining ring segments 42 and 44 about the plane A—A of the crankshaft and crankpin axes permits the two retaining ring assemblies 40 to be identical and interchangeable by 180° rotation about an axis located in this plane.

While only one specific embodiment of the invention has been shown and described for purposes of illustration, it is appreciated that various modifications may be made without departing from the spirit and scope of the invention as defined in the following claims.

What is claimed is:

1. Connecting rod structure for connecting at least one piston to a crankshaft including a main journal portion, a crank portion, and a crank pin, said structure comprising, said crankshaft, a connecting rod having a slipper at its crank pin end providing radially spaced inner and outer curved bearing faces, a mounting member adapted to be carried by the crankshaft, said mounting member providing a circular inner bearing surface radially spaced from said crank pin and coacting with the outer bearing face of said, slipper to maintain the inner faces of said slipper in bearing engagement with said crank pin, and means for nonrotatively securing said mounting member to said crank portion inwardly of said crankpin and adjacent said main journal portion, said securing means being within the peripheral paths defined by said member and said crank portion upon rotation of said crankshaft.

2. The connecting rod structure as set forth in claim 1 and including a lubricant supply passage connectable at one end to a source of lubricant supply and terminating at its opposite end in at least one orifice controllable by said slipper and adapted to direct lubricant radially inwardly toward said crank pin.

3. The combination as set forth in claim 1 and including at least one lubricant supply passage formed in said retaining ring and connectable at one end to a source of lubricant supply, each of said passages terminating at its opposite end in an orifice controllable by said slipper and adapted to direct lubricant radially inwardly from the inner bearing surface of said retaining ring toward the outer bearing face of said slipper and the bearing surface of said crank pin.

4. In a construction for connecting a piston to a crankshaft including axially spaced main shaft portions interconnected by two crank portions and a crank pin, the combination comprising, said crankshaft, a retaining ring nonrotatively carried by each of the crank portions, said retaining rings coacting with said crank pin to provide a circular track limited radially by spaced concentric bearing surfaces, a connecting rod having a slipper at its crank pin end provided with curved inner and outer bearing faces adapted to move in sliding relation with respect to the inner and outer bearing surfaces of the track, lubricant supply passages formed in said crankshaft and having inlets connectable to a lubricant pressure source and outlets terminating in said crank portions adjacent each of said retaining rings, and lubricating passages formed in said retaining rings, said lubricating passages communicating with said first-mentioned passages and terminating in radially inwardly directed nozzles for sequentially delivering lubricant onto the outer bearing face of said slipper and onto the bearing surface of said crank pin.

5. Structure for connecting a plurality of pistons to a common crank pin interconnecting axially spaced crank arm portions of a crankshaft comprising, in combination, a plurality of connecting rods each having a slipper at its crank pin end providing radially spaced inner and outer curved bearing faces, a mounting member adapted to be nonrotatively carried by each of said crank portions independently of said crank pin, each of said mounting members providing a circular inner bearing surface radially spaced from the crank pin and coacting with the outer bearing faces of said slippers to maintain the inner bearing faces of said slippers in bearing engagement with said crank pin and to limit movement of the rods in a radial direction with respect to the mounting members, and means securing each of said mounting members to said crankshaft in a plane adjacent to the rotational axis of said crankshaft and normal to a second plane including the axes of said crankshaft and said crank pin.

6. The structure as set forth in claim 5 and including lubricant supply passages formed in each of said mounting members and connectable to a source of lubricant, said passages terminating at the inner bearing surface of said mounting member in orifices directed radially inwardly to deliver lubricant onto the bearing surface of said crank pin and onto the outer bearing faces of said slippers.

7. An assembly for connecting a plurality of pistons to a common crank pin carried by a crank portion of a rotatively mounted crankshaft, said assembly comprising, in combination, a plurality of connecting rods each having a slipper at its crank pin end providing radially spaced inner and outer curved bearing faces, a mounting member adapted to be nonrotatively carried by the crank portion independently of said crank pin, said mounting member providing a circular inner bearing surface radially spaced from the crank pin and coacting with the outer bearing faces of said slippers to maintain the inner bearing faces of said slippers in bearing engagement with said crank pin and to limit movement of the rods in radial direction with respect to the mounting member, and means rigidly securing said mounting member to said crank portion adjacent the rotational axis of the crankshaft, said means lying in a plane substantially normal to a second plane passing through the rotational axis of said crankshaft and the axis of said crank pin, and lubricating means associated with said crankshaft and said mounting member for directing oil radially inwardly from the inner bearing surface of said mounting member toward said crank pin.

8. In combination, a crankshaft including spaced axially aligned main journal portions and paired crank portions interconnected eccentrically of the main journal axis by a crank pin, a connecting rod mounting member rotationally fixed on each of said crank portions adjacent said main journal portions, each of said mounting members having an inner bearing surface concentric with said crank pin, and a plurality of connecting rods each having an arcuate slipper projecting axially of the crank pin end thereof, said slippers having curved inner and outer bearing faces in bearing engagement with the crank pin and the inner bearing surfaces of the mounting members, respectively, lubricant supply passages in said crank portions connectable to a source of lubricant pressure and connected to lubricant supply passages in said mounting members terminating in nozzles for directing lubricant alternately onto the outer bearing faces of the slippers and onto the bearing surface of the crank pin.

9. In combination, a crankshaft including spaced axially aligned main journal portions and paired crank portions interconnected eccentrically of the main journal axis by a crank pin, a retaining ring assembly adapted to be rotationally fixed on each of said crank portions adjacent said main journal portions, means for so mounting each of said assemblies on one of the crank portions, each of said retaining ring assemblies comprising two asymmetrical segments providing an inner bearing surface concentric with said crank pin and split on a diametrical plane normal to a second plane including the axes of the crankshaft and the crank pin and retaining bolts normal to said diametrical plane and securing said segments together, each of said retaining ring assemblies and said mounting means being symmetrical about said second plane, and a plurality of connecting rods each having an arcuate slipper projecting axially of the crank pin end thereof, said slippers having curved inner and outer bearing faces coacting with the crank pin and the inner bearing surfaces of the retaining ring assemblies, respectively.

10. The combination as set forth in claim 9 and including lubricant supply passages formed in at least one segment of each of said retaining ring assemblies which are connectable to a lubricant source and terminate in nozzles for directing lubricant alternately onto the outer bearing faces of the slippers and onto the bearing surface of the crank pin.

11. The combination as set forth in claim 10 and in which lubricant supply passages and said nozzles in each of said segments are formed symmetrically of said second plane.

References Cited in the file of this patent
UNITED STATES PATENTS

| | | |
|---|---|---|
| 424,659 | Solano | Apr. 1, 1890 |
| 618,775 | Brotherhood | Jan. 31, 1899 |
| 682,389 | Riley | Sept. 10, 1901 |
| 751,694 | Shearer | Feb. 9, 1904 |
| 767,877 | Fleming | Aug. 16, 1904 |
| 840,190 | Anderson | Jan. 1, 1907 |
| 859,795 | Anderson | July 9, 1907 |
| 974,935 | Van Bosch | Nov. 8, 1910 |
| 1,368,179 | Maire | Feb. 8, 1921 |
| 2,226,940 | Meyer et al. | Dec. 31, 1940 |
| 2,272,172 | Hill | Feb. 10, 1942 |
| 2,419,408 | Lightowler | Apr. 22, 1947 |